United States Patent
Sakoda et al.

(10) Patent No.: US 6,277,491 B1
(45) Date of Patent: Aug. 21, 2001

(54) EXPANDABLE THERMOPLASTIC RESIN BEADS AND MOLDED FOAM MADE FROM THE SAME

(75) Inventors: Yasuhiro Sakoda, Koka-gun; Hiroyuki Takahashi, Moriyama; Masaya Sato; Narihiko Togo, both of Koka-gun, all of (JP)

(73) Assignee: Sekisui Kaseihin Kogyo KabushikiKaisha, Osaka (JP)

( * ) Notice: Subject to any disclaimer, the term of this patent is extended or adjusted under 35 U.S.C. 154(b) by 0 days.

(21) Appl. No.: 09/341,670
(22) PCT Filed: Jan. 8, 1998
(86) PCT No.: PCT/JP98/00041
  § 371 Date: Aug. 27, 1999
  § 102(e) Date: Aug. 27, 1999
(87) PCT Pub. No.: WO98/31733
  PCT Pub. Date: Jul. 23, 1998

(30) Foreign Application Priority Data

Jan. 20, 1997 (JP) .................................................. 9-007981

(51) Int. Cl.$^7$ ........................................................ B32B 5/16
(52) U.S. Cl. .............................. 428/407; 521/57; 521/134
(58) Field of Search .............................. 428/407; 521/57, 521/134

(56) References Cited

U.S. PATENT DOCUMENTS

| | | | |
|---|---|---|---|
| 3,994,841 | * 11/1976 | Ikeda et al. | 230/2.5 B |
| 4,110,267 | * 8/1978 | Ikeda et al. | 521/57 |
| 4,433,029 | * 2/1984 | Senda et al. | 428/407 |
| 4,698,367 | * 10/1987 | Ikeda et al. | 521/57 |
| 5,648,566 | * 7/1997 | Kruger et al. | 570/126 |
| 5,814,409 | * 9/1998 | Hane et al. | 428/421 |

FOREIGN PATENT DOCUMENTS

| | | |
|---|---|---|
| 62-158730 | 7/1987 | (JP) . |
| 3-190941 | 8/1991 | (JP) . |
| 5-140364 | 6/1993 | (JP) . |

* cited by examiner

Primary Examiner—Hoa T. Le
(74) Attorney, Agent, or Firm—Arent Fox Kintner Plotkin & Kahn, PLLC

(57) ABSTRACT

An object of the invention is to prevent an oil from penetrating into a vessel obtained from expandable thermoplastic resin beads through molding.

The above object is achieved by expandable thermoplastic resin beads whose surface or surface layer is coated or incorporated with a fluorine-containing block copolymer comprising of a fluorine-containing vinyl-type polymer segment derived from a fluorine-containing vinyl-type monomer and a lipophilic vinyl-type polymer segment derived from a lipophilic vinyl-type monomer.

10 Claims, No Drawings

EXPANDABLE THERMOPLASTIC RESIN BEADS AND MOLDED FOAM MADE FROM THE SAME

FIELD OF THE INVENTION

The present invention relates to expandable thermoplastic resin beads and expanded molded articles used for them. More particularly, it is directed to expandable thermoplastic resin beads containing a specific fluorine-containing block copolymer and their expanded molded articles. The expandable thermoplastic resin beads according to the present invention are used as various molded articles and are suitably used as expansion molded materials for vessels for foods and drinks containing oil and fat components such as precooked (instant) noodles, fried chicken, fat-containing foods, regular coffee and the like. Further, these are also useful as expansion molded materials for drain pans (pans) used in home air-conditioners or the like, vessels for aqueous solution of surfactants, portable ice boxes or the like.

BACKGROUND OF THE INVENTION

The expandable thermoplastic resin beads can be manufactured according to the process as shown below. For example, they are manufactured by impregnating polystyrene resin beads in the form of aqueous suspension, with a volatile aliphatic hydrocarbon enabling to slightly swell them such as n-pentane or the like, or by impregnating polystyrene resin beads in the form of aqueous suspension containing a small amount of such a solvent as toluene, cyclohexane or the like having solubility for the polystyrene resin beads, with such an blowing agent as butane, propane or the like the gaseous form at ordinary temperature.

The expandable thermoplastic resin beads thus obtained are previously expanded to give pre-expanded beads. Then, these pre-expanded beads are charged in a metal mold of a molding machine, and heated over the softening point of the pre-expanded beads by introducing steam therein. Thus, each pre-expanded bead is fused into one to obtain a molded article as per the metal mold.

When the beads in the resultant molded article are not completely fused into one, however, there is a possibility that, for example, if the article is used as a vessel, contents permeate into an outside wall of the vessel or into the molded article, depending on the kind of the contents. In order to prevent this permeation, there has already been proposed a method of lowering the surface energy of the bead, that is to say, a method of enlarging the contact angle of the surface of a molded article to the contents to be permeated.

For example, Japanese Examined Patent Publication No. Hei 4(1992)-53890 discloses a proposal of surface coating with a random, block or graft copolymer of a fluorine-containing vinyl-type monomer and a hydrophilic vinyl-type monomer, Japanese Unexamined Patent Application No. Hei 1(1989)-210435 discloses a proposal of surface coating with ammonium phosphate of perfluoroalkylsulfonamide, and Japanese Unexamined Patent Application No. Hei 3(1991)-190941 discloses a proposal of surface coating with a random copolymer of a fluorine-containing vinyl monomer containing a hydrophilic component (ethylene oxide or propylene oxide group) with a lipophilic monomer All the surface modifying agents described in these patent publications are fluorine-series surface modifying agents which contain a hydrophilic component or a hydrophilic group.

However, even if the fluorine-series surface modifying agents containing a hydrophilic component or a hydrophilic group were used, satisfactory results were not always obtained in regard to performance enabling to prevent the permeation of fat and oil components and aqueous surfactant solutions; and stickiness of expandable thermoplastic resin beads which occurs during transportation of the beads after the pre-expanding. At first, the former will be explained below.

The vessels manufactured by molding expandable thermoplastic resin beads have a wide range of utilities because of the economy and heat-retaining property. Therefore, they are used, for example, as vessels for containing oily foods such as instant noodles, fried chicken and the like. In this case, the permeation of oil and fat components may become a problem, because the contents contained in the vessel during preserving in stock in the marketplace may be affected under the influence of temperature and moisture so much that oil and fat components or soup may effuse out to the outside wall. Furthermore, if an aqueous surfactant solution having a low surface tension is contained herein, the content will have permeated into the container so rapidly that it will be difficult to use the vessel. The above-mentioned proposals were made to cope with these problems but they were not satisfactory enough in regard to shielding property.

Secondly, the latter will be explained. A hydrophilic component or hydrophilic group is introduced in the surface modifying agent to prevent oil permeation, but it still accompanies a problem that the hydrophilic component absorbs water, which will cause the surface of the bead to be sticky. When such beads were pre-expanded, the beads become sticky after the pre-expanding so that the flowability of the beads tends to worsen. Therefore, there was a problem that it took a long time transport the beads on a net to remove fused beads in a bead-transferring pipe.

SUMMARY OF THE INVENTION

The present inventors have found out that, by coating the surface of expandable thermoplastic resin beads with a fluorine-containing block copolymer or incorporating the copolymer into the surface layer of the beads, a fluorine-containing vinyl-type polymer segment in the fluorine-containing block copolymer can effectively prevent the permeation of fats and oils or an aqueous surfactant solution and further a lipophilic vinyl-type polymer segment in the block copolymer can markedly reduce the stickiness of the beads, thereby providing performances stabilized over a long period of time. On the basis of this findings, the present invention has been completed.

Accordingly, the present invention provides expandable thermoplastic resin beads whose surface or surface layer is coated or incorporated with a fluorine-containing block copolymer comprising a fluorine-containing vinyl-type polymer segment derived from a fluorine-containing vinyl-type monomer and a lipophilic vinyl-type polymer segment derived from a lipophilic vinyl-type monomer.

Furthermore, the present invention provides expanded molded articles obtained by expansion molding the above-mentioned expandable thermoplastic resin beads.

DETAILED DESCRIPTION OF THE PREFERRED EMBODIMENT

The embodiments of the invention will be explained in more detail as follows.

The expandable thermoplastic resin beads and the expanded molded articles used for them according to the present invention are coated or incorporated with a fluorine-containing block copolymer comprising of a fluorine-containing vinyl-type polymer segment and a lipophilic vinyl-type polymer segment.

In the present invention, there is no particular limitation on the kind of thermoplastic resins which are a base materials for the expandable thermoplastic resin beads, as far as they are resins which can be expanded with a blowing agent. Examples of the resins are aromatic vinyl resins such as polystyrene, high-impact polystyrene, styrene-(meth)acrylic acid copolymer, styrene-methyl (meth)acrylate copolymer, styrene-maleic anhydride copolymer; AS resin or the like; olefinic homopolymer or copolymer such as polymethacrylate, polyvinylidene chloride, polyethylene, polypropylene, ethylene-vinyl acetate copolymer or the like; a homopolymer or its mixture such as polyphenyleneether or a mixed resin of polyphenyleneether and polystyrene; and a composite resin prepared by subjecting a part of polyolefin to graft copolymerization with vinyl monomer. Of them, aromatic vinyl resins and polyolefin are preferable, and polystyrene is particularly preferable.

The expandable thermoplastic resin beads can be prepared by impregnating the thermoplastic resin beads as the base material with one or more kinds of blowing agents, which are a liquid or gas at normal temperature, for example, aliphatic hydrocarbons such as propane, n-butane, isobutane, n-pentane, isopentane, cyclopentane or the like; Freon compounds such as Freon 11, Freon 12 or the like; and inorganic compounds such as carbon dioxide, nitrogen or the like at the ratio of 2 to 20% by weight for the thermoplastic resin beads. In addition, these expandable thermoplastic resin beads include expanded beads which were expanded to an optional density (so-called pre-expanded beads). Normally, the resin beads made of styrene resin are put into market in the form that they are impregnated with a blowing agent, and the resin beads made of olefin resin are put into market in the form that they are pre-expanded.

Furthermore, these expandable thermoplastic resin beads may contain flame retardants, coloring agents, solvents (for example, toluene, cyclohexane, ethyl benzene, etc.) or the like to the extent that the effect of the present invention are not lessened.

As regards the method of impregnating with blowing agent(s), any methods already known may be adopted. For example, there is illustrated a method of impregnating with a blowing agent the thermoplastic resin beads in the form of aqueous suspension in an autoclave.

Next, the fluorine-containing vinyl-type monomer which constitutes the fluorine-containing vinyl-type polymer segment according to the present invention illustratively includes the following general formulae (A) through (G).

general formula (A):

general formula (B):

general formula (C):

general formula (D):

general formula (E):

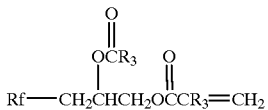

general formula (F):

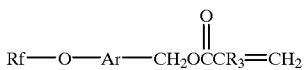

general formula (G):

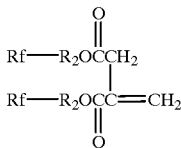

In the above formulae, Rf is a polyfluoroalkyl or polyfluoroalkenyl group of 3–21 carbon atoms, $R_1$ is a hydrogen atom or an alkyl group of 1–10 carbon atoms, $R_2$ is an alkylene group of 1 to 10 carbon atoms, $R_3$ is a hydrogen atom or methyl group, and Ar is an arylene group optionally having a substituent.

These monomers may be used singly or in a combination thereof.

Examples of the polyfluoroalkyl groups expressed by Rf in the above general formulae are such groups of propyl, butyl, pentyl, hexyl, heptyl octyl, nonyl, decyl, undecyl, dodecyl, tridecyl, tetradecyl, pentadecyl, hexadecyl, heptadecyl, octadecyl, nonadecyl, icosyl, henicosyl and the like, whose constitutional hydrogen atoms are substituted with a desired number of fluorine atoms. Normally, a perfluoroalkyl group is preferable.

Examples of the polyfluoroalkenyl groups expressed by Rf in the above general formulae are such groups of propenyl, butenyl, pentenyl, hexenyl, heptenyl, octenyl, nonenyl, decenyl, undecenyl, dodecenyl, tridecenyl, tetradecenyl, pentadecenyl, hexadecenyl, heptadecenyl, octadecenyl, nonadecenyl, icosenyl, henicosenyl and the like, whose constitutional hydrogen atoms are substituted by a desired number of fluorine atoms. Normally, it should preferably be a perfluoroalkenyl group.

The above polyfluoroalkyl or polyfluoroalkenyl groups are preferred to have 6 to 10 carbon atoms. If a monomer having not more than two carbon atoms is used, the fluorine-containing block copolymer formed therefrom does not exhibit a sufficient property to prevent the permeation of either fat and oil components or aqueous surfactant solutions. If a monomer having not less than 22 carbon atoms is used, the conversion of the polymerization to a fluorine-containing block copolymer is unfavorably lowered due to a considerably long chain.

Examples of the alkyl groups expressed by $R_1$ in the above general formulae are methyl, ethyl, propyl, butyl, pentyl, hexyl, heptyl, octyl, nonyl, decyl, isopropyl, isobutyl, isopentyl, isohexyl, isooctyl, isononyl and the like. Of these alkyl groups, an alkyl group having 1 to 4 carbon atoms is preferable. If the alkyl group contains more than 10 carbon atoms, the conversion of the polymerization is unfavorably lowered due to a considerably long chain.

Examples of the alkylene groups expressed by $R_2$ in the above general formulae are methylene, ethylene, trimethylene, tetramethylene, pentamethylene, hexamethylene, heptamethylene, octamethylene, nonamethylene, decamethylene and the like. Of these alkylene groups, an alkylene group having 1 to 4 carbon atoms is preferable. If the alkylene group has more than 10 carbon atoms, the conversion of the polymerization is unfavorably lowered due to a considerably long chain.

Examples of the arylene groups expressed by Ar in the above general formulae are phenylene, naphthylene and the like. These arylene groups can have a substituent. An example of the substituent is a hydroxy group. Examples of the preferable arylene group are phenylene, hydroxyphenylene and the like.

Specific examples of the fluorine-containing vinyl-type monomers represented by the general formulae (A) through (G) are shown below.

1) Group of the general formula (A)

$F(CF_2)_6(CH_2)_2OCOCH=CH_2$ (a-1)

$F(CF_2)_8(CH_2)_2OCOCH=CH_2$ (a-2)

$F(CF_2)_{10}(CH_2)_2OCOCH=CH_2$ (a-3)

$H(CF_2)_8CH_2OCOCH=CH_2$ (a-4)

$(CF_3)_2CF(CF_2)_6-(CH_2)_2OCOCH=CH_2$ (a-5)

$(CF_3)_2CF(CF_2)_8-(CH_2)_2OCOCH=CH_2$ (a-6)

$F(CF_2)_6(CH_2)_2-OCOC(CH_3)=CH_2$ (a-7)

$F(CF_2)_8(CH_2)_2-OCOC(CH_3)=CH_2$ (a-8)

$F(CF_2)_{10}(CH_2)_2-OCOC(CH_3)=CH_2$ (a-9)

$H(CF_2)_8CH_2OCOC(CH_3)=CH_2$ (a-10)

$(CF_3)_2CF(CF_2)_6-(CH_2)_2OCOC(CH_3)=CH_2$ (a-11)

$(CF_3)_2CF(CF_2)_8-(CH_2)_2OCOC(CH_3)=CH_2$ (a-12)

2) Group of the general formula (B):

$F(CF_2)_8SO_2N(CH_3)-CH_2CH_2OCOCH=CH_2$ (b-1)

$F(CF_2)_8SO_2N(CH_3)-(CH_2)_4OCOCH=CH_2$ (b-2)

$F(CF_2)_8SO_2N(CH_3)-(CH_2)_{10}OCOCH=CH_2$ (b-3)

$F(CF_2)_3SO_2N(C_2H_5)C-(CH_2CH_3)HCH_2OCOCH=CH_2$ (b-4)

$F(CF_2)_8SO_2N(CH_3)-CH_2CH_2OCOC(CH_3)=CH_2$ (b-5)

$F(CF_2)_3SO_2N(C_2H_5)-CH_2CH_2OCOC(CH_3)=CH_2$ (b-6)

$F(CF_2)_3SO_2N(C_3H_7)-CH_2CH_2OCOC(CH_3)=CH_2$ (b-7)

3) Group of the general formula (C):

$F(CF_2)_2CON(C_2H_5)-CH_2OCOCH=CH_2$ (c-1)

$F(CF_2)_3CON(CH_3)-CH(CH_3)CH_2OCOCH=CH_2$ (c-2)

$F(CF_2)_8CON(CH_2CH_2CH_3)-CH_2CH_2OCOC(CH_3)=CH_2$ (c-3)

$F(CF_2)_8CON(C_2H_5)-CH_2OCOC(CH_3)=CH_2$ (c-4)

4) Group of the general formula (D):

$F(CF_2)_8CH_2CH(OH)-CH_2OCOCH=CH_2$ (d-1)

$(CF_3)_2CF(CF_2)_2CH_2-CH(OH)CH_2OCOCH=CH_2$ (d-2)

$F(CF_2)_8CH_2CH(OH)-CH_2OCOC(CH_3)=CH_2$ (d-3)

$(CF_3)_2CF(CF_2)_2CH_2-CH(OH)CH_2OCOC(CH_3)=CH_2$ (d-4)

5) Group of the formula (E):

$(CF_3)_2CF(CH_2)_6CH_2-CH(OCOCH_3)CH_2OCOCH=CH_2$ (e-1)

$(CF_3)_2CF(CH_2)_6CH_2CH(OCOCH_3)-CH_3OCOC(CH_3)=CH_2$ (e-2)

6) Group of the general formula (F):

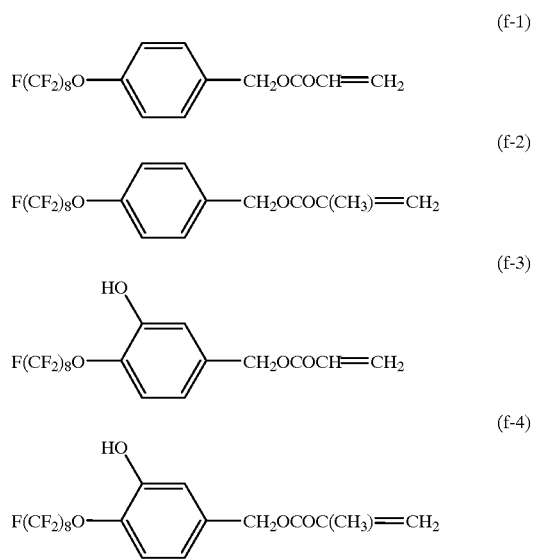

7) Group of the formula (G):

(g-1)

$F(CF_2)_8(CH_2)_2OCOCH_2$
$\quad\quad |$
$F(CF_2)_8(CH_2)_2OCOC=CH_2$

Examples of the fluorine-containing vinyl-type monomers are shown below, as monomers except for these fluorine-containing vinyl-type monomers (A) through (G).

$F(CF_2)_6CH_2OCH=CH_2$
$F(CF_2)_8CH_2OCH=CH_2$
$F(CF_2)_{10}CH_2OCH=CH_2$
$F(CF_2)_6CH_2OCF=CF_2$
$F(CF_2)_8CH_2OCF=CF_2$
$F(CF_2)_{10}CH_2OCF=CF_2$
$F(CF_2)_6CH=CH_2$
$F(CF_2)_8CH=CH_2$

F(CF$_2$)$_{10}$CH=CH$_2$
F(CF$_2$)$_6$CF=CF$_2$
F(CF$_2$)$_8$CF=CF$_2$
F(CF$_2$)$_{10}$CF=CF$_2$
CH$_2$=CF$_2$
CF$_2$=CF$_2$

The fluorine-containing vinyl-type monomers above may be used singly or in a combination of plural members thereof. Further, as the fluorine-containing vinyl-type monomer, the monomers shown by the general formula (A) are preferable because of higher conversion of the polymerization. Of the monomers as shown by the general formulae (B), (C) and (D), there is a possibility that somewhat stickiness occurs in the resultant expandable thermoplastic resin beads, because they have hydrophilic components such as sulfonamide group in the general formula (B), amide group in the general formula (C) and hydroxy group in the general formula (D). Furthermore, it is noted that the monomers of the general formula (A) show higher conversion of the polymerization than other monomers. In particular, the monomers (a-2), (a-8), (a-11) and (a-12) are preferred.

Moreover, the monomers such as HEMA, MMA, stearyl methacrylate or the like except for the fluorine-containing vinyl-type monomer (A) to (G) may be copolymerized with the fluorine-containing vinyl-type monomer to the extent that the property preventing permeation of oil and fat components and aqueous solution of surfactant is not lowered. In that case, appropriate amount thereof is not more than 3% by weight to the fluorine containing vinyl-type polymer segment.

Next, the lipophilic vinyl-type polymer segment of the present invention is formed from a lipophilic vinyl-type monomer. This lipophilic vinyl-type monomer means a lipophilic vinyl-type monomer which does not contain a fluorine atom. Specific lipophilic vinyl-type monomer is represented by the following general formula (H):

(H):R$_4$—OCOCR$_5$=CH$_2$ (wherein R$_4$ is an alkyl group of 8–22 carbon atoms, a cycloalkyl group of 6–15 carbon atoms or phenyl group, each group optionally having a substituent, and R$_5$ is a hydrogen atom or methyl group). These monomers may be used singly or in combination thereof.

Examples of the alkyl groups expressed by R$_4$ in the above general formula are octyl, nonyl, decyl, undecyl, dodecyl, tridecyl, tetradecyl, pentadecyl, hexadecyl, heptadecyl, octadecyl, nonadecyl, icosyl, henicosyl, docosyl and the like. Examples of the cycloalkyl groups are cyclohexyl, cycloheptyl, cyclooctyl and the like.

The alkyl, cycloalkyl and phenyl groups of R$_4$ may optionally have a substituent. Examples of the substituent are a lower alkyl group of 1 to 3 carbon atoms, an aryl group such as phenyl and the like.

Specific examples of the above general formula (H) (hereinafter referrred to as "(meth)acrylate" in combination of acrylate and methacrylate) are 2-ethylhexyl (meth)acrylate, octyl (meth)acrylate, isooctyl (meth)acrylate, decyl (meth)acrylate, isodecyl (meth)acrylate, undecyl (meth)acrylate, lauryl (meth)acrylate, dodecyl (meth)acrylate, tridecyl (meth)acrylate, tetradecyl (meth)acrylate, pentadecyl (meth)acrylate, hexadecyl (meth)acrylate, stearyl (meth)acrylate, behenyl (meth)acrylate, cyclohexyl (meth)acrylate, benzyl (meth)acrylate and the like.

Of the lipophilic vinyl-type monomers above, examples of the component which does not lower the prevention of permeating water and oils contained in the fluorine-containing vinyl-type polymer segment particularly without inducing stickiness of beads are lauryl (meth)acrylate, dodecyl (meth)acrylate, tridecyl (meth)acrylate, tetradecyl (meth)acrylate, pentadecyl (meth)acrylate, hexadecyl (meth)acrylate, stearyl (meth)acrylate, behenyl (meth)acrylate and the like. It is preferable in the present invention to produce the fluorine-containing block copolymer using these lipophilic vinyl-type monomers.

Further, monomers other than the lipophilic vinyl-type monomers may be used. An appropriate amount of the monomers other than the lipophilic vinyl-type monomers is not more than 3% by weight to the lipophilic vinyl-type polymer segment in this case.

The monomers other than the lipophilic vinyl-type monomers are shown by the general formula (I):

(I):

(HO)$_2$POR$_6$OCCR$_7$=CH$_2$ (wherein R$_6$ is an alkylene group of 1–4 carbon atoms optionally having a substituent, and R$_7$ is a hydrogen atom or methyl group). It is considered that the monomer of the general formula (I) contributes in an effect to prevent corrosion of metals by the resultant fluorine-containing block copolymer. The corrosion occurring in the metal mold at the time of molding can be prevented by using a copolymer obtained by copolymerizing the lipophilic vinyl-type monomer with the monomer of the general formula (I). Appropriate ratio of the monomer of the general formula (I) is not more than 3% by weight to the lipophilic vinyl-type polymer segment.

Specific examples of the monomers of the general formula (I) are monomers (i-1) through (i-6) as shown below.

(i-1)
(HO)$_2$PO(CH$_2$)$_2$OCCH=CH$_2$ (i-2)
(HO)$_2$PO(CH$_2$)$_3$OCCH=CH$_2$ (i-3)
(HO)$_2$POCH$_2$CHOCCH=CH$_2$ (with CH$_3$)

(i-4)
(HO)$_2$PO(CH$_2$)$_2$OCC(CH$_3$)=CH$_2$ (i-5)
(HO)$_2$PO(CH$_2$)$_3$OCC(CH$_3$)=CH$_2$ (i-6)
(HO)$_2$POCH$_2$CHOCC(CH$_3$)=CH$_2$ (with CH$_3$)

The ratio of the fluorine-containing vinyl-type polymer segment to the lipophilic vinyl-type polymer segment in the fluorine-containing block copolymer is preferably 20/80 to 80/20 by weight, more preferably 50/50 to 70/30 by weight. If the fluorine-containing vinyl-type polymer segment is in a ratio of not more than 20% by weight, the arrangement of the fluorine-substituted alkyl group on the surface of the resin beads is so insufficient that unfavorably there is an inclination of running short of the preventing property of permeating oil and fat components and aqueous surfactant solutions. If the content of the fluorine-containing polymer segment exceeds 80% by weight, it is difficult to coat uniformly the fluorine-containing block copolymer on the surface of the expandable thermoplastic resin beads. Therefore, the fluorine-containing block copolymer may unfavorably fail in prevailing all over the molded articles in the course of pre-expanding and molding these resin beads without sufficiently exhibiting the effect of the present invention.

The molecular weight of the fluorine-containing block copolymer is appropriately in the range of 3,000 to 300,000 in the form of weight average molecular weight by converting into polystyrene in a solution in tetrahydrofuran (THF) as a solvent, using Gel Permeation Chromatography (GPC) (Device HLC-8020 manufactured by Tosoh Corporation in Japan), and most of them can be used in the range of 10,000 to 50,000 as weight average molecular weight. If it does not reach 3,000, no sufficient oil repellency is attained. If it exceeds 300,000, the viscosity becomes so high that the film-manufacturing property and surface permeation property on the surface of the expandable thermoplastic resin beads will unfavorably decrease.

Subsequently, a process for manufacturing the fluorine-containing block copolymer is explained in detail. For the purpose of manufacturing the fluorine-containing block copolymer, for example, one or more lipophilic vinyl-type monomers are polymerized in the presence of a polymeric peroxide as an initiator for polymerization to give a peroxide bond-containing polymer. Further, the mixture of one or more kinds of fluorine-containing vinyl-type monomers is polymerized by using the resultant peroxide bond-containing polymer as an initiator for polymerization. Such a polymerization method can be performed by applying known manufacturing methods (for example, Japanese Examined Patent Publications No. Hei 5(1993)-41668 and No. Hei 5(1993)-59942).

The polymeric peroxide to be used at the time of manufacturing the fluorine-containing block copolymer means a compound containing two or more peroxide bonds in one molecule. Various polymeric peroxides described in Japanese Examined Patent Publication No. Hei 5(1993)-59942 can be also used as the polymeric peroxide in the present invention. Furthermore, the polymeric peroxide may be used singly or in a combination of plural kinds thereof.

For example, the following polymeric peroxides of the general formulae (1) through (3) can be used as a polymeric peroxide.

general formula (1):

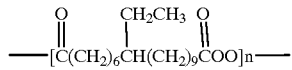

general formula (2):

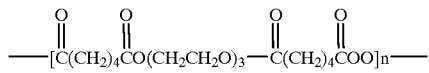

general formula (3):

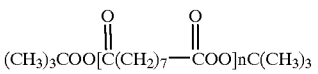

(in the above general formulae above, n is an integer from 2–20).

The fluorine-containing block copolymers can be manufactured by any of solution polymerization, bulk polymerization, suspension polymerization and emulsion polymerization methods using the above polymeric peroxide.

In case of the solution polymerization method for manufacturing the fluorine-containing block copolymer in the present invention, for example, the preparation of the lipophilic vinyl-type polymer segment in the first step and the preparation of the fluorine-containing vinyl-type polymer segment in the second step can be explained as follows.

Thus, the lipophilic vinyl-type monomer to prepare the lipophilic vinyl-type polymer segment is at first polymerized in a solution (organic solvent or the like) by using a polymeric peroxide as a polymerization initiator to give the peroxide bond-containing lipophilic vinyl-type polymer in which the peroxide bond has been introduced in the chain. Then, the fluorine-containing vinyl-type monomer is added to the reaction mixture obtained in the first step, and the resultant mixture is subjected to polymerization in the second step, whereby the peroxide bond in the peroxide bond-containing lipophilic vinyl-type polymer is cleaved to produce effectively the fluorine-containing block copolymer.

In addition, the order of the step in the above-mentioned two step polymerization method may be reversed by using the lipophilic vinyl-type monomer in the first step for the second step and reacting the fluorine-containing vinyl-type monomer of the first step for the second step.

The amount of the polymeric peroxide to be used in the first step for manufacturing the fluorine-containing block copolymer in the present invention is normally 0.5–20 parts by weight to 100 parts by weight of the lipophilic vinyl-type monomer or the fluorine-containing vinyl-type monomer, and the polymerization at that time is performed at a temperature of 40–130° C. for a period of 2–12 hours. The polymerization at the second step is performed at a temperature of 40–140° C. for a period of 3–15 hours.

The fluorine-containing block copolymer thus-obtained can be used in the form of a solution or suspension in an organic solvent as shown below or in the form of an emulsified solution by dispersing in water in the presence of a surfactant or the like. Further, it can be also used in the form of fine powders of the fluorine-containing block copolymer.

Next, the organic solvent will be explained in detail below. There is no limitation to the organic solvent as far as it can dissolve or disperse the fluorine-containing block copolymer. Examples thereof are methanol, ethanol, n-propanol, 2-propanol, 1-butanol, 2-butanol, 2-methyl-1-propanol, 2-methyl-2-propanol, 1-pentanol, 2-pentanol, 3-pentanol, cyclopentanol, 2-hexanol, 3-hexanol, cyclohexanol, methyl cellosolve, ethyl cellosolve, acetone, 2-butanone, 3-methyl-2-butanone, 2-pentanone, 3-pentanone, 2-methyl-3-pentanone, 3-methyl-2-pentanone, 4-methyl-2-pentanone, 2,4-dimethyl-3-pentanone, 4,4-dimethyl-2-pentanone, 2-hexanone, 3-hexanone, cyclopentanone, cyclohexanone, 2-heptanone, 3-heptanone, 4-heptanone, 2-methyl-3-hexanone, 5-methyl-2-hexanone, 5-methyl-3-hexanone, methyl acetate, ethyl acetate, propyl acetate, isopropyl acetate, butyl acetate, methyl trimethylacetate, isobutyl acetate, sec-butyl acetate, pentyl acetate, isoamyl acetate, methyl propionate, ethyl propionate, propyl propionate, butyl propionate, isobutyl propionate, tert-butyl propionate, isobutyl propionate, methyl butyrate, ethyl butyrate, propyl butyrate, isopropyl butyrate, methyl isobutyrate, ethyl isobutyrate, methyl 2-methylbutyrate, methyl caproate, benzene, toluene, ethylbenzene, xylene, cyclohexane, hexane, isohexane, isohexene, heptane, octane, isooctane, nonane, isononane, decane, undecane, dodecane, tridecane, isoparaffin solvent (NAS-3, NAS-4, NAS-5H manufactured by NOF Corporation in Japan), formamide, acetamide, dimethylformamide, dimethylacetamide, acetonitrile, tetrahydrofuran, 1,1,2-trifluoro-1,2,2,-trichloroethane, tetrachlorodifluoroethane, methylchloroform, hexafluoroisopropanol, (meta) paraxylene hexafluoride, perfluorohexane, perfluoroheptane and the like. These organic solvents may be used singly or in a mixture of two or more members thereof.

Of them, preferable solvents for dissolving or dispersing the fluorine-containing block copolymer are hexane, isohexane, isohexene, heptane, octane, isooctane, nonane, isononane, decane, undecane, dodecane, tridecane, isopraffin solvent (NAS-3 manufactured by NOF corporation) and the like.

The fluorine-containing block copolymer according to the present invention is usually diluted in the organic solvent for coating or incorporating into the expandable thermoplastic resin beads. The coating or incorporation may be carried out by a method of coating the surface of the resin beads with the fluorine-containing copolymer through sufficient mixing using such a mixer as ribbon blender, V blender, Henschel mixer, Ledage mixer or the like, and a method of adding the fluorine-containing block copolymer at the time of impregnating the resin beads with a blowing agent to contain it in the surface layer of the resin beads.

When the fluorine-containing block copolymer is used in powdery form, it is preferable to coat beforehand the surface of the expandable thermoplastic resin beads with a spreader such as liquid polyethylene glycol, liquid polybutene or the like and then with the powdery fluorine-containing block copolymer.

In addition to the fluorine-containing block copolymer, other coating components already known may be added in the coating above. For example, metal salts of higher fatty acids may be illustrated therefor. The metal salts of higher fatty acid show effects including prevention of aggregation at the time of pre-expanding, releasing from the mold, improvement in slipperiness of the molded article and effect of preventing the permeation of the content of vessel for foods. Examples of the metal salts of higher fatty acid are zinc, magnesium, calcium, aluminum and the like metal salts of higher fatty acids such as stearic acid, lauric acid, myristic acid or the like. Of them, zinc stearate is preferably used.

The fluorine-containing block copolymer of the present invention for coating the resin beads or incorporating in the resin beads is preferably used at 0.003–0.2% by weight to the expandable thermoplastic resin beads, more preferably 0.005–0.1% by weight. If its amount is less than 0.003% by weight, it is difficult to attain satisfactory effect in preventing the permeation of oil and fat contents and aqueous solution of surfactant. If it exceeds 0.2% by weight, there is unfavorably an inclination to inhibit the fusion of each expanded beads at the time of molding.

Meanwhile, in case of using together the fluorine-containing block copolymer and the metal salt of higher fatty acid in the present invention, the metal salt of higher fatty acid is used at 0.05–0.5% by weight, preferably 0.05–0.35% by weight to the expandable thermoplastic resin beads.

The characteristics of the present invention consists in that the expanded articles which are obtained by molding the expandable thermoplastic resin beads of the present invention exhibit the properties of preventing the permeation of oils and fats and aqueous surfactant solutions and of inhibiting fusion at the time of molding the resin beads. Such effects are considered to depend upon the fact that the arrangement of perfluoroalkyl group in the fluorine-containing block copolymer, particularly in an uniform arrangement of the terminal $CF_3$ group on the surface of the expandable resin beads would markedly lower the surface energy to afford water-repellency and oil-repellency.

The expanded molded articles can be manufactured in a conventional manner, for example, by filling the expandable thermoplastic resin beads in a desired shape of metal mold and heating it with steam.

Even if the expanded molded articles such as vessels for foods (e.g. tableware, etc.), containers for foods or the like molded from the expandable thermoplastic resin beads in the present invention were used directly for packaging oily and fat foods such as tallow, vegetable oils such as soybean oil, rapeseed oil or the like, lard, pre-cooked noodles, stew, mayonnaise, dressing sauce, curry roux, butter, margarine, white sauce, yogurts, ice cream, doughnut, hamburger, fried chicken or the like, or for preserving aqueous solution of surfactant, it is possible to refrain from permeation of oil and fat contents, aqueous solution, pigments or the like from each expanded beads into outside over a long period of time. Thus, the application range of the present invention has been enlarged to the uses in which the products of the present invention were never applied in the past.

Similarly, it is also possible to raise the commercial value of vessels for surfactant, drain pan for home air conditioner, portable ice box, fish box or the like.

Moreover, of any materials to be used in the present invention, in case of using any materials for manufacturing vessels for foods, such additives to be used should be a material of which safety on the sanitary of foods has been guaranteed, and it is normally used in the limited range in which amount or other conditions to be used is allowable.

The present invention will be in detail explained by the following examples.

EXAMPLE 1

[Synthetic Example of a Fluorine-containing Block Copolymer]

To a 500 ml four-neck flask equipped with a thermometer, dropping funnel, nitrogen gas inlet and stirring device, nitrogen gas and then 175 g of isoparaffin (NAS-3 manufactured by NOF Corporation) were introduced, and it was heated at 70° C. Then, the mixture of 39 g of stearyl methacrylate as a lipophilic vinyl-type monomer, 5 g of polymeric peroxide of the general formula (1) and 50 g of isoparaffin was dropwise added in 2 hours. Thereafter, the resultant mixture was allowed to react at 70° C. for 4 hours. And 58.5 g of the fluorine-containing vinyl-type monomer of the formula (a-2) were dropwise added in 1 hour. Subsequently, the reaction was continued at 70° C. for 5 hours.

It was found that the fluorine-containing block copolymer occupied 30% by weight in the isoparaffin solution, and the resultant fluorine-containing block copolymer consisted of 60% by weight of the fluorine-containing vinyl-type polymer segment and 40% by weight of the lipophilic vinyl-type polymer segment.

[Example of the Manufacture of an Expanded Molded Article]

Into Henschel mixer were added 1000 g of expandable polystyrene resin beads of 0.3–0.5 mm diameter containing 5.5% by weight of n-pentane as a flowing agent, 0.4 g of the above isoparaffin solution of fluorine-containing block copolymer, 0.2 g of polyethylene glycol and 2.3 g of zinc stearate, and the resultant mixture was stirred to give expandable polystyrene resin beads of which surface was coated with the copolymer. The whole beads were pre-expanded by uniformly heating in an atmospherically saturated steam at about 90° C. for 5 minutes so that pre-expanded beads of 100 g/L of bulkiness were obtained.

The pre-expanded beads were aged and dried in a thermostatic chamber of 30° C. for 6 hours, filled in a cup-shaped metal mold of inner volume 500 ml and wall thickness 2 mm and heated with 2.0 kg/cm² of steam for 5 seconds, and cooled to give a polystyrene resin expanded article molded from the metal mold. The expanded molded article was subjected to the oil and fat permeation test and the surfactant permeation test. Table 4 shows the results above.

[Permeation Test for Oils and Fats]

Into the cup above was put flavoring ingredients (Kayaku) containing curry powder usually used for pre-cooked noodles up to about 80% height, and the whole cup was wrapped and sealed with a sheet of drawn polypropylene resin film, allowed to stand in an oven of 60° C. for 48 hours. The state of permeating oil and fat components and yellow pigment of curry powder into the outside surface of the cup was evaluated. Table 1 shows the standard for evaluation.

TABLE 1

| Mark | ⊚ | ○ | Δ | X |
|---|---|---|---|---|
| Permeation ratio (%) of oil and fat components and yellow pigment per outer surface area of the cup | 0–10 Very good | 11–20 Good | 21–50 Slightly bad | 51–100 Bad |

[Permeation Test for an Aqueous Surfactant Solution]

Into the cup was introduced a colored solution of 1.0 g of a nonionic surfactant (Kao Emulgen 810) and 0.05 g of Eriochrome Black T in 1 L of water, and it was allowed to stand at room temperature for an hour. The state of permeation into the outer surface of the cup was evaluated. Table 2 shows the standard for evaluation.

TABLE 2

| Mark | ⊚ | ○ | Δ | X |
|---|---|---|---|---|
| Standard for evaluation | Very good | Good | Slightly bad | Bad |

[Stickiness Test]

Soon after the pre-expanding, the pre-expanded beads were introduced into a vessel in cylindrical shape of diameter 80 mm and height 70 mm, and the vessel was picked up. Diameter D of the mountain occurred at that time was measured and evaluated. Table 3 shows the standard for evaluation.

TABLE 3

| Mark | ⊚ | ○ | Δ | X |
|---|---|---|---|---|
| Diameter D | not less than 23 cm Very good | 22.9–21 cm Good | 20.9–19 cm Slightly bad | less than 19 cm Bad |

EXAMPLES 2 THROUGH 5

The procedure of Example 1 was repeated except that the kind of the fluorine-containing vinyl-type monomer was substituted as shown in Table 4 in the synthesis of the fluorine-containing block copolymer. Table 4 shows the result of evaluation.

TABLE 4

| | Composition of the fluorine-containing block copolymer | | | | | | | |
|---|---|---|---|---|---|---|---|---|
| | Fluorine-containing vinyl-type polymer segment | | Other segment | | Weight average molecular weight of the fluorine- | Permeation | Permeation test for an aqueous | |
| | Kind of the monomer | Ratio (wt %) | Kind of the monomer | Ratio (wt %) | containing block copolymer | test for oils and fats | surfactant solution | Stickiness test |
| Example 1 | a - 2 | 60 | SMA | 40 | 40000 | ⊚ | ⊚ | ⊚ |
| Example 2 | a - 5 | 60 | SMA | 40 | 50000 | ⊚ | ⊚ | ⊚ |
| Example 3 | b - 1 | 60 | SMA | 40 | 30000 | ⊚ | ○ | ○ |
| Example 4 | d - 1 | 60 | SMA | 40 | 20000 | ⊚ | ○ | ○ |
| Example 5 | a - 2/a - 5 | 30/30 | SMA | 40 | 40000 | ⊚ | ⊚ | ⊚ |
| Example 6 | a - 2 | 60 | SMA | 40 | 40000 | ⊚ | ○ | ○ |
| Example 7 | a - 2 | 60 | SMA | 40 | 40000 | ⊚ | ⊚ | ⊚ |
| Example 8 | a - 2 | 60 | SMA | 40 | 40000 | ⊚ | ⊚ | ⊚ |
| | Composition of the fluorine-containing random copolymer | | | | | | | |
| | Fluorine-containing component | | Other segment | | Weight average molecular weight of the fluorine- | Permeation | Permeation test for an aqueous | |
| | Kind of the monomer | Ratio (wt %) | Kind of the monomer | Ratio (wt %) | containing block copolymer | test for oils and fats | surfactant solution | Stickiness test |
| Comparative Example 1 | a - 2 | 60 | SMA | 40 | 40000 | X | ○ | ⊚ |
| Comparative Example 2 | a - 5 | 60 | SMA | 40 | 30000 | X | ○ | ⊚ |
| Comparative Example 3 | b - 1 | 60 | SMA | 40 | 30000 | Δ | Δ | ○ |

TABLE 4-continued

| Comparative Example 4 | z - 1 | 60 | SMA | 40 | 50000 | Δ | Δ | ◯ |
| Comparative Example 5 | — | — | — | — | — | X | X | ◯ | z - 1: F(CF$_2$)$_8$(CH$_2$CH$_2$O)$_2$COC(CH$_3$)=CH$_2$
SMA: Stearyl methacrylate
—: Fluorine-containing block copolymer not used Comparative Example 1

[Synthetic Example of Fluorine-containing Random Copolymer]

Into the four-neck flask as described in Example 1 were introduced nitrogen gas and then 175 g of isoparaffin (NAS-3 manufactured by NOF Corporation). The mixture was heated at 60° C. Then, the mixture of 39 g of stearyl methacrylate as a lipophilic vinyl-type monomer, 58.5 g of the fluorine-containing vinyl-type monomer (a-2), 1 g of t-butyl peroxypivalate and 50 g of isoparaffin was dropwise added in 2 hours. The reaction then was continued at 60° C. for 7 hours.

It was found that the fluorine-containing random copolymer occupied 30% by weight in the isoparaffin solution, and the resultant fluorine-containing random copolymer consisted of 60% by weight of the fluorine-containing vinyl-type polymer and 40% by weight of the lipophilic vinyl type-polymer.

[Manufacturing Example of Expanded Molded Article]

Into Henschel mixer were added 1000 g of the expanded polystyrene resin beads of 0.3–0.5 mm diameter containing 5.5% by weight of n-pentane as a blowing agent, 0.4 g of the isoparaffin solution of fluorine-containing random copolymer, 0.2 g of polyethylene glycol and 2.3 g of zinc stearate, and the resultant mixture was stirred to give expandable polystyrene resin beads of which surface was coated with the copolymer. The whole beads were pre-expanded by uniformly heating in an atmospherically saturated steam at about 90° C. over a period of 5 minutes so that pre-expanded beads of 100 g/L of bulkiness were obtained.

The pre-expanded beads were aged and dried in a thermostatic chamber of 30° C. for 6 hours and filled in a cup-shaped metal mold of 500 ml of inner volume and 2 mm of wall thickness. The whole was heated with 2.0 kg/cm$^2$ of steam for 5 seconds and cooled to give the polystyrene resin expanded article molded from the metal mold. The expanded molded article was subjected to the oil and fat permeation test and surfactant permeation test. Table 4 shows the result above.

EXAMPLE 6

The procedure of Example 1 was repeated except that no zinc stearate was added in the manufacturing process of the expanded molded article. Table 4 shows the result of evaluation.

EXAMPLE 7

The procedure of Example 1 was repeated except that in the manufacturing process of the expanded molded article the expandable polystyrene resin beads of 0.3–0.5 mm diameter containing 5.5% by weight of n-pentane was replaced by a expandable denatured polyethylene-type resin beads (complex resin of 70% by weight of polyethylene and 30% by weight of polystyrene) of 0.3–0.5 mm diameter containing 7.0% by weight of isobutane. Table 4 shows the result of evaluation.

EXAMPLE 8

The procedure of Example 1 was repeated except that in the manufacturing process of the expanded molded article the expanded polystyrene resin beads of 0.3–0.5 mm diameter containing 5.5% by weight of n-pentane was replaced by a expandable AS-type resin beads (copolymer of 25% by weight of acrylonitrile and 75% by weight of styrene) of 0.3–0.5 mm diameter containing 6.0% by weight of cyclopentane. Table 4 shows the result of evaluation.

Comparative Examples 2 Through 4

The procedure of Comparative Example 1 was repeated except that in the synthetic example of the fluorine-containing random copolymer, the kind of the fluorine-containing vinyl-type monomer was substituted as shown in Table 4. Table 4 shows the result of evaluation.

Comparative Example 5

The procedure of Example 1 was repeated except that the isoparaffin solution of the fluorine-containing block copolymer was not added in the manufacturing process of the expanded molded article. Table 4 shows the result of evaluation.

EXAMPLES 9 THROUGH 14

The procedure of Example 1 was repeated except that in the synthesis of the fluorine-containing block copolymer, the amount of the fluorine-containing vinyl-type monomer and that of the lipophilic vinyl-type monomer were substituted so that the ratio of the fluorine-containing vinyl-type polymer segment to other segment in the fluorine-containing block copolymer would be as shown in Table 5. Table 5 shows the result of evaluation.

[0062]

TABLE 5

| | Composition of the fluorine-containing block copolymer | | | | Weight average molecular weight of the fluorine-containing block copolymer | Permeation test for oils and fats | Permeation test for an aqueous surfactant solution | Stickiness test |
|---|---|---|---|---|---|---|---|---|
| | Fluorine-containing vinyl-type polymer segment | | Other segment | | | | | |
| | Kind of the monomer | Ratio (wt %) | Kind of the monomer | Ratio (wt %) | | | | |
| Example 9 | a - 2 | 90 | SMA | 10 | 20000 | ○ | ○ | ⊚ |
| Example 10 | a - 2 | 80 | SMA | 20 | 30000 | ⊚ | ○ | ⊚ |
| Example 11 | a - 2 | 70 | SMA | 30 | 40000 | ⊚ | ⊚ | ⊚ |
| Example 12 | a - 2 | 50 | SMA | 50 | 40000 | ⊚ | ⊚ | ⊚ |
| Example 13 | a - 2 | 20 | SMA | 80 | 50000 | ○ | ⊚ | ⊚ |
| Example 14 | a - 2 | 10 | SMA | 90 | 60000 | ○ | ○ | ⊚ |

EXAMPLES 15 THROUGH 17

Comparative Examples 6 Through 8

The procedure of Example 1 was repeated except that in the synthesis of the fluorine-containing block copolymer, the kind of the monomer other than the fluorine-containing vinyl-type monomers was substituted as shown in Table 6. Table 6 shows the result of evaluation.

TABLE 6

| | Composition of the fluorine-containing block copolymer | | | | Weight average molecular weight of the fluorine-containing block copolymer | Permeation test for oils and fats | Permeation test for an aqueous surfactant solution | Stickiness test |
|---|---|---|---|---|---|---|---|---|
| | Fluorine-containing vinyl-type polymer segment | | Other segment | | | | | |
| | Kind of the monomer | Ratio (wt %) | Kind of the monomer | Ratio (wt %) | | | | |
| Example 15 | a - 2 | 60 | DMA | 40 | 40000 | ○ | ⊚ | ⊚ |
| Comparative Example 6 | a - 2 | 60 | HEMA | 40 | 30000 | ⊚ | X | X |
| Example 16 | a - 2 | 60 | SMA/DMA | 20/20 | 30000 | ⊚ | ⊚ | ⊚ |
| Comparative Example 7 | a - 2 | 60 | SMA/HEMA | 20/20 | 30000 | ⊚ | X | Δ |
| Example 17 | a - 2 | 60 | SMA/i - 1 | 37/3 | 20000 | ⊚ | ○ | ⊚ |
| Comparative Example 8 | a - 2 | 60 | SMA/i - 1 | 30/10 | 30000 | Δ | X | Δ |

DMA: Decyl methacrylate
HEMA: 2-Hydroxyethyl methacrylate

The expandable thermoplastic resin beads of the present invention are characterized in that the expandable thermoplastic resin beads are coated with or incorporate a fluorine-containing block copolymer comprising a fluorine-containing vinyl-type polymer segment derived from a fluorine-containing vinyl-type monomer and a lipophilic vinyl-type polymer segment derived from a lipophilic vinyl-type monomer.

Accordingly, the expanded molded articles showing excellent property for preventing the permeation of oils and fats, aqueous surfactant solution and the like into outside can be obtained.

Further, since stickiness of pre-expanded beads is inhibited enabling to shorten the time for transportation and drying the pre-expanded beads when the expandable thermoplastic resin beads are pre-expand to optional density, improvement on the productivity can be attained.

What is claimed is:

1. Expandable thermoplastic resin beads whose surface or surface layer is coated or incorporated with a fluorine-containing block copolymer comprising a fluorine-containing vinyl-type polymer segment derived from a fluorine-containing vinyl-type monomer selected from the general formulae (A) to (G):

general formula (A):

general formula (B):

general formula (C):

general formula (D):

general formula (E):

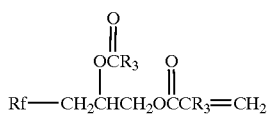

general formula (F):

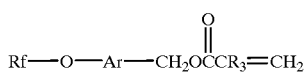

general formula (G):

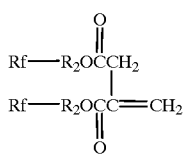

wherein Rf is a polyfluoroalkyl or polyfluoroalkenyl group of 3–21 carbon atoms, $R_1$ is a hydrogen atom or an alkyl group of 1–10 carbon atoms, $R_2$ is an alkylene group of 1 to 10 carbon atoms, $R_3$ is a hydrogen atom or methyl group, and Ar is an arylene group optionally having a substituent;

and a lipophilic vinyl-type polymer segment derived from a lipophilic vinyl-type monomer.

2. The expandable thermoplastic resin beads according to claim 1 wherein the fluorine-containing block copolymer comprises 20–80% by weight of the fluorine-containing vinyl-type polymer segment and 80–20% by weight of the lipophilic vinyl-type polymer segment.

3. The expandable thermoplastic resin beads according to claim 2 wherein the fluorine-containing block copolymer comprises 50–70% by weight of the fluorine-containing vinyl-type polymer segment and 50–30% by weight of the lipophilic vinyl-type polymer segment.

4. The expandable thermoplastic resin beads according to any one of claims 1 through 3 wherein the lipophilic vinyl-type monomer is selected from the monomers represented by the following general formula (H):

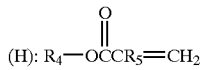

wherein $R_4$ is an alkyl group of 8–22 carbon atoms, a cycloalkyl group of 6–15 carbon atoms or phenyl group, each group optionally having a substituent, and $R_5$ is a hydrogen atom or methyl group.

5. The expandable thermoplastic resin beads according to claim 1 wherein the lipophilic vinyl-type polymer segment comprises a copolymer consisting of not less than 97% by weight of a lipophilic vinyl-type monomer and not more than 3% by weight of a monomer represented by the following general formula (I):

wherein $R_6$ is an alkylene group of 1 to 4 carbon atoms optionally having a substituent, and $R_7$ is a hydrogen atom or methyl group.

6. The expandable thermoplastic resin beads according to claim 1 wherein the expandable thermoplastic resin beads are further coated with or incorporate a metal salt of a higher fatty acid.

7. The expandable thermoplastic resin beads according to claim 1 wherein the expandable thermoplastic resin beads are pre-expanded beads.

8. The expanded molded articles obtained by pre-expanding and molding the expandable thermoplastic resin beads according to claim 1.

9. The expanded molded articles according to claim 8 wherein the expanded molded articles are vessels for foods and drinks containing oil and fat components.

10. The expanded molded articles according to claim 9 wherein the expanded molded articles are vessels for pre-cooked foods and instant drinks.

* * * * *